United States Patent Office 3,107,155
Patented Oct. 15, 1963

3,107,155
RADIOACTIVE IODINE PROCESS
Geoffrey Irving Gleason, Oak Ridge, Tenn., assignor to Abbott Laboratories, North Chicago, Ill., a corporation of Illinois
No Drawing. Filed June 23, 1960, Ser. No. 38,110
7 Claims. (Cl. 23—218)

This invention relates to a method for recovering radioactive iodine, in particular a method of recovering radioactive iodine from irradiated elemental tellurium.

Radioactive iodine[131], hereinafter also referred to as $I^{131}$, has many useful applications as a therapeutic agent and tracer in the hands of the radioisotope chemist. A very popular method for obtaining $I^{131}$ is by irradiating metallic or elemental tellurium. The tellurium metal is a target material in a neutron flux reactor wherein it is exposed to irradiation for a suitable period. The metallic tellurium which is 35.4% tellurium[130] is converted to the radioactive isotope tellurium[131]. This latter material is spontaneously converted to $I^{131}$ following $\beta$-emission.

A continuing difficulty of practicing this method in the art is the complex and numerous separation steps which are required to gather a useful form of $I^{131}$ free from its precursor tellurium. The known methods for producing $I^{131}$ from irradiated tellurium involve the steps of the so-called wet process which starts with the already irradiated target elemental tellurium. This tellurium target is treated with sulfochromic acid and an extremely violent reaction occurs which transforms the tellurium into tellurate and the iodine into iodate. The mixture must then be treated with oxalic acid to convert the tellurates to tellurites and to reduce the iodate to elementary iodine. Removal of the radioactive elemental iodine by distillation results in impure distillates which must again be treated before such $I^{131}$ can be utilized for medical purposes. The use of the oxalate in the foregoing purification process has an additional disadvantage in that it provides opportunity for carbon dioxide which undesirably collects in the absorption system. Another method has been described in the art by Taugbol and Sanisahl, Jenner Report No. 34 (1954). This method requires temperatures in excess of 500° C. and reduced pressures to volatilize $I^{131}$ from tellurium dioxide. The method is hampered by the requirement of cumbersome apparatus, the presence of a complex technique and the possibility of an uncontrollable reaction.

The serious difficulties associated with the foregoing purification processes have led the practitioners in the art to seek other means of isolating $I^{131}$ from tellurium. One such method involves the use of telluric acid which does provide the desired $I^{131}$ in fewer and simpler purification steps following irradiation of the telluric acid. The use of this telluric acid target however has other undesirable features in that the temperature of the neutron reactor must be carefully controlled to prevent a violent reaction which would rupture the capsule enclosing the telluric acid target material. It is also obvious that smaller amounts of target material are irradiated because a good amount of said target material comprises useless non-tellurium portions (the hydrogen and oxygen atoms).

It is, therefore, an object of this invention to provide a method of separating $I^{131}$ from irradiated elemental tellurium.

It is another object of this invention to provide a method whereby $I^{131}$ is produced from irradiated elemental tellurium by fewer and simpler process steps than were practiced heretofore.

It is still another object of this invention to provide a method for producing high-quality $I^{131}$ from irradiated elemental tellurium by a substantially direct and single separation procedure.

In the accomplishment of the foregoing objects and other objects which will be apparent, it is now provided that irradiated elemental tellurium powder is treated with a mixture of hydrogen peroxide and sulfuric acid and thereafter the reaction mixture is distilled to obtain the radioactive elemental iodine in a useful form. The practice of the process provides that irradiated elemental tellurium is added to sulfuric acid, and then hydrogen peroxide is added to this mixture to initiate a spontaneous reaction. After the reaction is terminated, heat is applied to the mixture to distill the $I^{131}$ into a solution of sodium sulfite wherein the $I^{131}$ is reduced to a convenient sodium iodide form. This solution of radioactive sodium iodide or $NaI^{131}$ can be employed for the multiple utilities wherein $I^{131}$ presence is required.

The advantages of the method are attained by employing various concentrations of the acid and various volume ratios of the acid and the hydrogen peroxide. An advantage in the practice of the method, however, is realized by employing a sulfuric acid solution consisting of about equal volumes of concentrated acid and water; and a volume of hydrogen peroxide which is about one-third or one-fourth the volume of the sulfuric acid solution when the concentration of said hydrogen peroxide is about 35%. The foregoing sulfuric acid solution can be also described as 1:1 $H_2SO_4$ or 50% sulfuric acid. A convenient sulfuric acid solution is about 30% to 70%, that is about 3 to 7 parts concentrated sulfuric acid and about 7 to 3 parts, respectively, of water. Operable hydrogen peroxide solutions are about 20% to 35%. It will of course be apparent that the respective volumes of sulfuric acid and hydrogen peroxide solutions can be increased when the reagent concentrations therein are decreased. If such modifications are taken, then the practitioner should consider whether the resulting larger volumes are suitable for his purposes with the particular amount of tellurium employed.

It has been found that when the hydrogen peroxide is added to the reaction mixture to initiate the reaction, there may appear a transient appearance of insoluble granular material in the reaction mixture. This insoluble material is rapidly re-dissolved by the simple step of adding a volume of water, preferably about equal to the volume of the reaction mixture.

The foregoing method is practiced to better advantage when the reaction mixture is stirred. Although the reaction of tellurium and hydrogen peroxide and sulfuric acid is a vigorous reaction with evolution of heat, the reaction is still completed in shorter periods of time by the simple expedient of stirring the reaction mixture. The stirring step, while conventional, does contribute to the more efficient practice of the method, especially where the method is practiced with larger volumes and amounts of reactant. It is well within the skill of the practitioner to ascertain the required vigorousness of the stirring. The stirring should be performed with sufficient vigor to mildly agitate the tellurium powder, thereby attaining more complete contact between the various reactants.

The $I^{131}$ associated with the elemental tellurium can be more neatly separated therefrom if the particle size of said tellurium is neither too large nor too small. Tellurium metal that is in an exceptionally fine powder form tends to cause a more violent reaction which must be more carefully controlled. Such small particle size also increases the hazard of handling radioactive material because minute particle sizes float and drift to a greater extent than more heavier particles. It is also observed that if the particle sizes are very large, then the reaction requires increasingly longer periods to be fully completed. It is therefore preferred that the irradiated target tellurium should be preferably of a particle size which will pass through a #100 to about a #200 mesh screen. Such screens and their identifying numbers are understood in the pharmaceutical and chemical arts to define the number of wire strands in both vertical and horizontal directions per square inch of area. Thus, a #100 screen will have 100 vertical strands and 100 horizontal strands per square inch.

It must be remembered that exceptionally minute amounts of $I^{131}$ are produced from the irradiated tellurium target material; therefore, a carrier may be desired to enhance recovery of such minute amounts. Although the $I^{131}$ may be separated without a carrier, it is a preferred practice to include a carrier in the method. Thus, a milligram of potassium iodide, which for the purposes of the process is a significant mass, is gainfully used to "carry" $I^{131}$ atoms which figuratively could be more accurately considered by their numbers rather than by their mass. A small amount of such a "carrier" is sufficient for the purposes of the method, especially where even minute masses of a carrier can support immense numbers of radioactive atoms. It requires only 1 mg. of potassium iodide to adequately carry the $I^{131}$ separated from about 40 gm. of irradiated tellurium.

The following examples are presented to illustrate the practice of the method, but such examples are not intended to be exclusive embodiments of the invention.

*Example I*

Tellurium metal having a particle size which passes through a screen with a mesh size of #100 but not through a #200 screen is placed in an aluminum capsule and irradiated in a Brookhaven National Laboratory neutron reactor. After a sufficient exposure to the neutron bombardment, the capsule is removed and a 1 gm. sample of the tellurium metal powder is withdrawn for processing. Into a three-necked stoppered flask is placed 10 ml. 1:1 $H_2SO_4$ and 1 mg. of potassium iodide carrier. To the middle stopper of this flask is affixed a distilling column and cooling tube which terminates in a glass receiver. In one of the unstoppered openings is inserted a separatory funnel which contains 3 ml. of a 35% hydrogen peroxide solution. The flask is seated in a heating mantle and under the heating mantle is a magnetic motor whose flux rotates a stirring bar in the bottom of the three-necked flask. The 1 gm. of irradiated tellurium is added to the mildly agitated sulfuric acid, the flask is stoppered and the stop cock on the separatory funnel containing the hydrogen peroxide is opened to introduce the 3 ml. of the hydrogen peroxide solution to the reaction mixture. The reaction immediately commences and continues to termination which is reached in about 15 minutes. To the mixture is then added about 10 ml. of water and the heating mantle is put into operation to commence the distillation step. The receiver container at the end of the cooling tube and distilling column contains therein 4 ml. of a 1/10 normal sodium hydroxide solution having additionally present therein 2.5 mg. of sodium sulfite. Distillation is continued until about 5 ml. of solution is collected in the receiver. This solution contains about 98% of the obtainable $I^{131}$ atoms in the form of sodium iodide or $NaI^{131}$. The solution which is withdrawn from the receiver is found to contain a total activity in the range of 30.40 mc.

*Example II*

Into a three-necked two liter flask equipped with heating mantle and a magnetic stirring bar are added 400 ml. of a 50% sulfuric acid solution and 1 mg. of potassium iodide carrier. The mixture is stirred and to the mildly agitated mixture is added 40 gm. of neutron irradiated tellurium metal which has a particle size that passes through a #100 mesh screen, but does not pass through a #200 mesh screen. The flask is stoppered and from a separatory funnel affixed to one of the openings is transferred 100 ml. of a 35% hydrogen peroxide solution. The reaction is instantaneously commenced and is allowed to terminate (about 15 minutes). The presence of any insoluble material within the reaction mixture is eliminated by the introduction of about an equal volume of water to the flask. The heating mantle surrounding the flask is then put into operation and distillation is continued as in Example I until about 50 ml. of distillate is collected in the receiver container. The receiver container holds 4 ml. of a 1/10 normal sodium hydroxide solution in which is additionally present 2.5 gm. of sodium sulfite. The $I^{131}$ in this solution is present in the sodium iodide form or $NaI^{131}$. The total activity of this solution is about 2-3 curies.

The amount of $I^{131}$ recoverable from the irradiated tellurium will, of course, depend on the extent and efficiency of the neutron bombardment of the tellurium target in the neutron reactor. The neutron reactor described in the instant disclosure is the air-cooled Brookhaven reactor in which a neutron flux (number of neutrons traversing a square centimeter of space per second) is directed at a target material for a specified period of time. Higher flux results in a greater $I^{131}$ activity per gram of elemental tellurium material. This activity is conventionally described in units of curies or (c.), millicuries (mc.) and microcuries ($\mu$c.). The curie is defined as the quantity of any radioactive nuclide in which the number of disintegrations per second is $3.7 \times 10^{10}$.

The radioactive activity of $I^{131}$ obtained by this method may be approximately calculated from the formula:

$$A = N_\sigma f (1 - e^{-\lambda t})$$

in the foregoing formula, A represents the activity of $I^{131}$ in disintegrations/sec., N is the number of $Te^{130}$ target atoms, $\sigma$ is the capture probability in barns ($10^{-24}$ cm.$^2$) for $Te^{130}$ per each gram of elemental tellurium irradiated, $t$ represents the irradiation time in days, $f$ represents the neutron flux or n/cm.$^2$/sec. and $\lambda$ is the decay constant of the $I^{131}$ (days$^{-1}$). According to this formula, 1 gm. of elemental tellurium will provide the following maximum (or saturation) activities for each given flux:

| Flux | Approximate saturation yield |
|---|---|
| $10^{11}$ n/cm.$^2$/sec. | 1.0 mc./gm. Te. |
| $10^{12}$ n/cm.$^2$/sec. | 10.0 mc./gm. Te. |
| $10^{13}$ n/cm.$^2$/sec. | 100.0 mc./gm. Te. |
| $10^{14}$ n/cm.$^2$/sec. | 1,000.0 mc./gm. Te or 1 curie. |

The disclosure herein has described various modifications which result in a more efficient practice of the method. Among such modifications are the relative amounts of the hydrogen peroxide solution and the sulfuric acid solution, namely, about 1 part of a 35% hydrogen peroxide solution to about 3 or 4 parts of a sulfuric acid solution which is additionally prepared from 1 volume of concentrated sulfuric acid and 1 volume of distilled water. Other desirable modifications are the stirring of the reaction mixture, especially with the larger reaction mixture volumes. Another preferred condition of the process is the particle size of the tellurium metal powder. Despite the real advantages attained from the foregoing conditions and modifications, it is not intended that the disclosure thereof be necessarily interpreted as critical conditions upon which depend the operability of the method. The basic contribution of the novel method is operable and successful by treating other particle sizes of tellurium with other concentrations and volumes of sulfuric acid and hydrogen peroxide, either with or without stirring. It is the ordinary skill of the chemist which will determine the exact modifications he prefers under the particular conditions and requirements of the procedure he has selected.

Others may practice the invention in any of the numerous ways which will be suggested by this disclosure to one skilled in the art. All such practice of the inven-

I claim:

1. A method for separating radioactive $I^{131}$ from irradiated elemental tellurium which comprises contacting said tellurium, having particle sizes which pass through mesh screens of from about #100 up to #200, with about a 30%–70% sulfuric acid solution, thereafter adding at least a stoichiometric amount of about a 20%–35% hydrogen peroxide solution; and distilling $I^{131}$ from the reaction mixture.

2. A method for separating radioactive $I^{131}$ from irradiated elemental tellurium which comprises contacting said irradiated elemental tellurium with about 3–4 volumes of a 30%–70% sulfuric acid solution and thereafter adding about 1 volume of a 20%–35% hydrogen peroxide solution to cause a reaction, allowing the reaction to substantially terminate; and thereafter distilling $I^{131}$ from the reaction mixture.

3. A method for separating radioactive $I^{131}$ from irradiated elemental tellurium which comprises contacting said tellurium, having particle sizes which pass through screens of about #100 up to #200, with about 3–4 volumes of about a 50% sulfuric acid solution containing an iodide carrier, and thereafter contacting the tellurium in acid with about 1 volume of a 35% hydrogen peroxide solution to initiate a reaction, allowing the reaction to substantially terminate; and thereafter distilling $I^{131}$ from the reaction mixture.

4. A method for separating radioactive $I^{131}$ from irradiated elemental tellurium which comprises adding said irradiated elemental tellurium to about 3–4 volumes of a 30–70% sulfuric acid solution, reacting said mixture with about 1 volume of a 20%–35% hydrogen peroxide solution; and thereafter distilling $I^{131}$ from the reaction mixture.

5. A method for separating radioactive $I^{131}$ from irradiated elemental tellurium which comprises adding said irradiated elemental tellurium, having particle sizes which pass through mesh screens of from about #100 up to #200, with about 3–4 volumes of about a 50% sulfuric acid solution containing an iodide carrier, reacting said mixture with about 1 volume of about a 35% hydrogen peroxide solution; and thereafter distilling $I^{131}$ from the reaction mixture.

6. A method for separating radioactive $I^{131}$ from irradiated elemental tellurium which comprises mildly agitating about 3–4 volumes of a 30%–70% sulfuric acid solution containing an iodide carrier, adding said irradiated elemental tellurium, having particle sizes which pass through mesh screens of from about #100 up to #200, to said mildly agitated sulfuric acid solution, reacting said mixture with about 1 volume of 20%–35% hydrogen peroxide solution, allowing the reaction to substantially terminate; and thereafter distilling $I^{131}$ from the reaction mixture.

7. A method for separating radioactive $I^{131}$ from irradiated elemental tellurium which comprises mildly agitating about a 10 ml. volume of about a 50% sulfuric acid solution containing an iodide carrier, adding about 1 gm. of said irradiated tellurium to said mildly agitated sulfuric acid solution, reacting said mixture with about 3 ml. of about a 35% hydrogen peroxide solution, allowing the reaction to substantially terminate; and thereafter distilling $I^{131}$ from the reaction mixture.

References Cited in the file of this patent

UNITED STATES PATENTS

| | | |
|---|---|---|
| 2,710,249 | Winsche et al. | June 7, 1955 |
| 2,942,943 | Greene et al. | June 28, 1960 |

FOREIGN PATENTS

| | | |
|---|---|---|
| 763,865 | Great Britain | Dec. 19, 1956 |